US012809241B2

(12) United States Patent
Dai et al.

(10) Patent No.: US 12,809,241 B2
(45) Date of Patent: Nov. 24, 2026

(54) OPTICAL MODULE AND PROJECTION DEVICE

(71) Applicant: Coretronic Corporation, Hsin-Chu (TW)

(72) Inventors: Meng-Syuan Dai, Hsin-Chu (TW); Chih-Sheng Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 255 days.

(21) Appl. No.: 18/427,832

(22) Filed: Jan. 31, 2024

(65) Prior Publication Data

US 2024/0264513 A1 Aug. 8, 2024

(30) Foreign Application Priority Data

Feb. 6, 2023 (CN) ......................... 202310065178.3

(51) Int. Cl.

*G03B 21/16* (2006.01)
*G02B 26/00* (2006.01)
*G03B 21/20* (2006.01)

(52) U.S. Cl.

CPC ........... *G03B 21/16* (2013.01); *G02B 26/008* (2013.01); *G03B 21/204* (2013.01)

(58) Field of Classification Search

CPC ...... G03B 21/16; G03B 21/18; G03B 21/145; G03B 21/204; G03B 21/2013; G03B 21/2033; G02B 26/00; G02B 26/02; G02B 26/008; H04N 9/3111; H04N 9/3114; H04N 9/3117; H04N 9/312; H04N 9/3135; H04N 9/3141; H04N 9/3144

See application file for complete search history.

(56) References Cited

U.S. PATENT DOCUMENTS

| | | | | |
|---|---|---|---|---|
| 2014/0055758 | A1* | 2/2014 | Tsukioka | G03B 21/16 353/58 |
| 2014/0209168 | A1* | 7/2014 | Zhamu | H10F 77/63 428/323 |
| 2017/0302894 | A1* | 10/2017 | Lin | G03B 21/204 |
| 2020/0225462 | A1* | 7/2020 | Hsu | H04N 9/3144 |
| 2021/0349379 | A1* | 11/2021 | Chen | G03B 21/2066 |
| 2022/0000191 | A1* | 1/2022 | Cauchy | B60N 2/5635 |
| 2022/0376462 | A1* | 11/2022 | Heikman | H01S 5/4056 |
| 2023/0147140 | A1* | 5/2023 | Hagihara | G03B 21/204 |

FOREIGN PATENT DOCUMENTS

| | | |
|---|---|---|
| CN | 206057778 | 3/2017 |
| CN | 107329355 | 4/2020 |
| CN | 114815478 | 7/2022 |

* cited by examiner

*Primary Examiner* — Sultan Chowdhury
(74) *Attorney, Agent, or Firm* — JCIPRNET

(57) ABSTRACT

An optical module includes a base body, a driving device, a phosphor disk. The base body includes a base and a support. The support has a first end portion and a second end portion opposite to each other, and the first end portion is connected to the base. The driving device is disposed at the second end portion of the support. The phosphor disk is connected to the driving device, and the driving device is suitable for driving the phosphor disk to rotate. The heat conduction structure is disposed on the support.

38 Claims, 7 Drawing Sheets

OPTICAL MODULE AND PROJECTION DEVICE

CROSS-REFERENCE TO RELATED APPLICATION

This application claims the priority benefit of China application serial no. 202310065178.3 filed on Feb. 6, 2023. The entirety of the above-mentioned patent application is hereby incorporated by reference herein and made a part of this specification.

BACKGROUND OF THE INVENTION

Field of the Invention

The invention relates to an optical module and a projection device, and in particular to an optical module including a heat conduction structure and a projection device having the optical module.

Description of Related Art

A general projection device (such as a projector) may convert an illumination beam into an image beam, and then project the image beam out of the projection device to display an image screen. The projection device usually has an optical coupler, and the optical coupler contains an optical element (such as a phosphor wheel) inside to further process the beam (such as conversion or combination of the beam).

In order to prevent foreign matter from adhering to the optical element and causing damage, the inside of the optical coupler must be in a completely airtight state. However, in this way, it is difficult for the heat generated by the optical element during operation to be discharged out of the optical coupler, which may cause the temperature inside the optical coupler to be too high. If a cooling element (such as a fan or cooling fins) is mounted inside the optical coupler, since the optical coupler itself is airtight and does not readily dissipate heat, and the space inside the optical coupler is extremely limited, the heat dissipation issue may not be effectively solved.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides an optical module and a projection device that may make the optical module obtain good heat dissipation.

Other objects and advantages of the invention may be further understood from the technical features disclosed in the invention.

To achieve one or part or all of the above objects or other objects, an embodiment of the invention provides an optical module. The optical module includes a base body, a driving device, a phosphor disk, and at least one heat conduction structure. The base body includes a base and a support. The support has a first end portion and a second end portion opposite to each other, and the first end portion is connected to the base. The driving device is disposed at the second end portion of the support. The phosphor disk is connected to the driving device, and the driving device is suitable for driving the phosphor disk to rotate. The heat conduction structure is disposed on the support.

To achieve one or part or all of the above objects or other objects, an embodiment of the invention provides a projection device. The projection device includes a light source, a light valve, a projection lens, and an optical module. The light source is configured to provide an illumination beam. The light valve is configured to convert the illumination beam into an image beam. The projection lens is configured to project the image beam out of the projection device. The optical module is located on a transmission path of the illumination beam, and includes a base body, a driving device, a phosphor disk, and at least one heat conduction structure. The base body includes a base and a support. The support has a first end portion and a second end portion opposite to each other, and the first end portion is connected to the base. The driving device is disposed at the second end portion of the support. The phosphor disk is connected to the driving device, and the driving device is suitable for driving the phosphor disk to rotate. The heat conduction structure is disposed on the support.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as “top,” “bottom,” “front,” “back,” etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
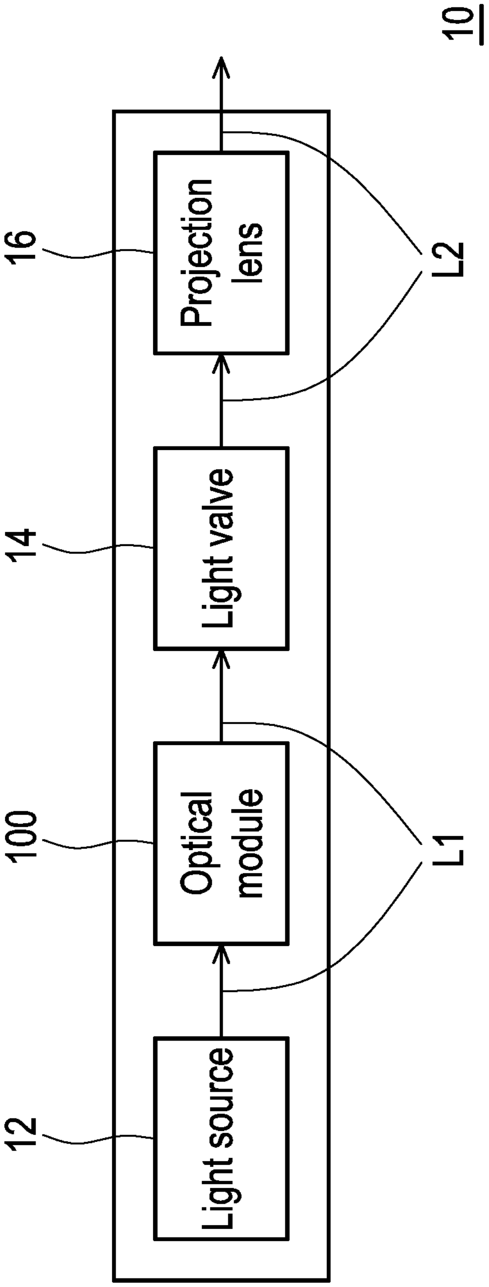
FIG. 1 is a schematic diagram of a projection device of an embodiment of the invention.

FIG. 1 is a schematic diagram of a projection device of an embodiment of the invention. Please refer to FIG. 1, a projection device 10 of the present embodiment includes a light source 12, an optical module 100, a light valve 14, and a projection lens 16. The light source 12 is configured to provide an illumination beam L1, and the light source 12 is, for example, a laser light source, a light-emitting diode (LED), or an organic light-emitting diode (OLED). The optical module 100 is disposed between the light source 12 and the light valve 14. The optical module 100 of the present embodiment is, for example, a wavelength conversion device for performing further optical processing on the illumination beam L1 (for example, wavelength conversion of the beam). The light valve 14 is located on the transmission path of the illumination beam L1 and configured to convert the illumination beam L1 into an image beam L2. The projection lens 16 is located on the transmission path of the image beam L2 and configured to project the image beam L2 out of the projection device 10.

Figure 2:
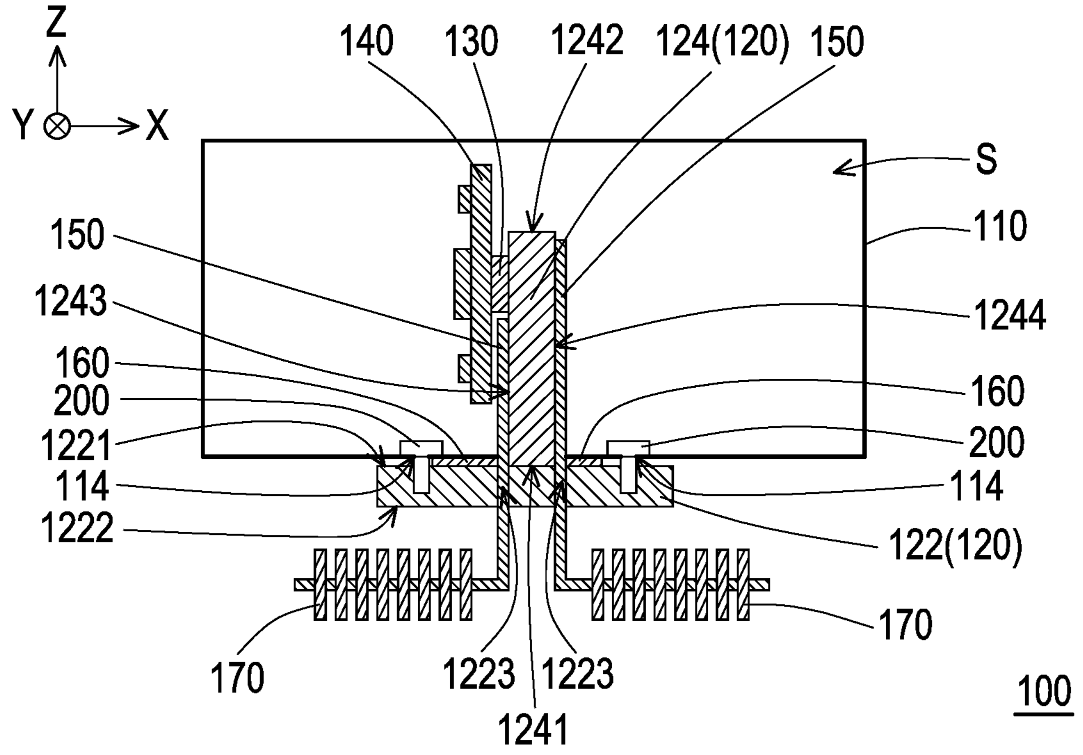
FIG. 2 is a schematic cross-sectional diagram of the optical module of FIG. 1.
Figure 3:
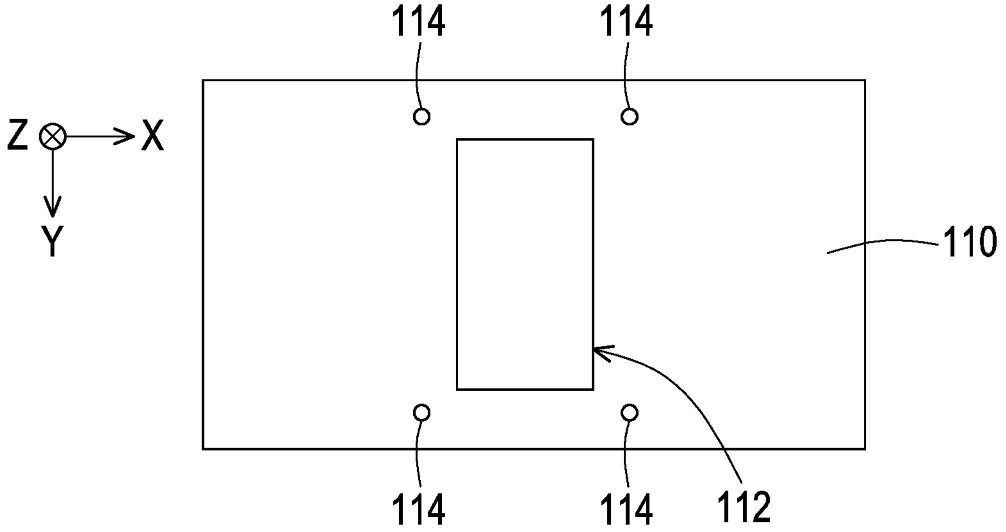
FIG. 3 is a schematic diagram of the bottom of the cover body of FIG. 2.

FIG. 2 is a schematic cross-sectional diagram of the optical module of FIG. 1. FIG. 3 is a schematic diagram of the bottom of the cover body of FIG. 2. Please refer to FIG. 2 and FIG. 3, the optical module 100 of the present embodiment includes a base body 120, a driving device 130, a phosphor disk 140, and at least one heat conduction structure 150. The base body 120 includes a base 122 and a support 124. The support 124 has a first end portion 1241 and a second end portion 1242 opposite to each other, and the first end portion 1241 is connected to the base 122. The driving device 130 is, for example, a motor disposed at the second end portion 1242 of the support 124. The phosphor disk 140 is connected to the driving device 130 and located on the transmission path of the illumination beam L1, and the driving device 130 is suitable for driving the phosphor disk 140 to rotate. The surface of the phosphor disk 140 has at least one phosphor material, and when the phosphor disk 140 is rotated, the phosphor material may be configured to receive the laser beam incident on the phosphor disk 140 (such as the illumination beam L1) and convert the laser beam into a colored light.

The heat conduction structure 150 is disposed on the support 124 and extended from the second end portion 1242 to the first end portion 1241 to guide the heat generated by the phosphor disk 140 and the driving device 130 during operation away from the phosphor disk 140 and the driving device 130. The heat conduction and heat dissipation methods of the optical module 100 are described in more detail below.

The optical module 100 of the present embodiment further includes a cover body 110 and a sealing structure 160 to protect the phosphor disk 140. The cover body 110 is assembled on the base 122 and has an accommodating space S. At least a portion of the support 124, the driving device 130, and the phosphor disk 140 are located in the accommodating space S. The cover body 110 has an opening 112 (FIG. 3), the base 122 covers the opening 112, and the support 124 passes through the opening 112 and is extended into the accommodating space S. The sealing structure 160 is, for example, a dust-proof rubber strip that may be disposed between the base 122 and the cover body 110 and surrounds the opening 112, so that the accommodating space S is airtight to prevent foreign matter from entering the accommodating space S and adhering to the phosphor disk 140 to cause contamination or damage thereto. It should be further explained that the cover body 110 may be assembled to the base by a plurality of fixing members 200. For example, the area of the cover body 110 adjacent to the opening 112 may include a plurality of positioning holes 114, the base 122 has corresponding screw holes corresponding to the positions of the positioning holes 114, the fixing members 200 may be screws, and the fixing members 200 may pass through the positioning holes 114 of the cover body 110 and be locked to the screw holes of the base 122 to fix the cover body 110 to the base 122.

As shown in FIG. 2, the support 124 has a first surface 1243 and a second surface 1244 opposite to each other. The first surface 1243 faces the phosphor disk 140. The heat conduction structure 150 may be disposed on the first surface 1243, the second surface 1244, or a combination thereof. In the present embodiment, the heat conduction structure 150 is a heat pipe that may be disposed at the first surface 1243 and the second surface 1244 via a welding method. The base 122 of the present embodiment includes at least one through hole 1223, and the support 124 is located at a first side 1221 of the base 122. The heat conduction structure 150 is extended from the first side 1221 through the through hole 1223 to a second side 1222 of the base 122 opposite to the first side 1221, and the sealing structure 160 surrounds the opening 112, so the airtightness of the optical module 100 is not affected. In this way, the heat generated during the operation of the phosphor disk 140 and the driving device 130 may be discharged out of the cover body 110 via the heat conduction path formed by the support 124 and the heat conduction structure 150 to achieve the effect of reducing the temperature inside the cover body 110 and improve the heat dissipation capability of the optical module 100.

In addition, the optical module 100 of the present embodiment further includes at least one heat dissipation structure 170. The heat dissipation structure 170 is, for example, a set of heat dissipation fins, but the type of the heat dissipation structure 170 is not limited thereto. The heat dissipation structure 170 is located outside the cover body 110 and disposed below the second side 1222 of the base 122, and the heat conduction structure 150 adjacent to the second side 1222 of the base 122 is connected to the heat dissipation structure 170. After the heat generated by the phosphor disk 140 and the driving device 130 is transferred to the heat conduction structure 150 adjacent to the second side 1222, the heat exchange of the heat conduction structure 150 may be accelerated by the heat dissipation structure 170, thereby improving the heat dissipation performance of the optical module 100.

When the heat conduction structure 150 is disposed at the support 124, the heat conduction structure 150 may also be in contact with the driving device 130 to provide another heat conduction path, so that the heat generated by the phosphor disk 140 and the driving device 130 is directly discharged out of the cover body 110 via the heat conduction structure 150. For example, the at least one heat conduction structure 150 located at the second surface 1244 of the support 124 may be in contact with a side of the driving device 130 aligned with or protruded beyond the second surface 1244 of the support 124.

In addition, the design of the invention is not limited to the heat dissipation of the phosphor disc 140, but may also be used to dissipate heat for other optical elements (such as filter wheels), and the object of heat dissipation is not limited thereto.

Figure 4:
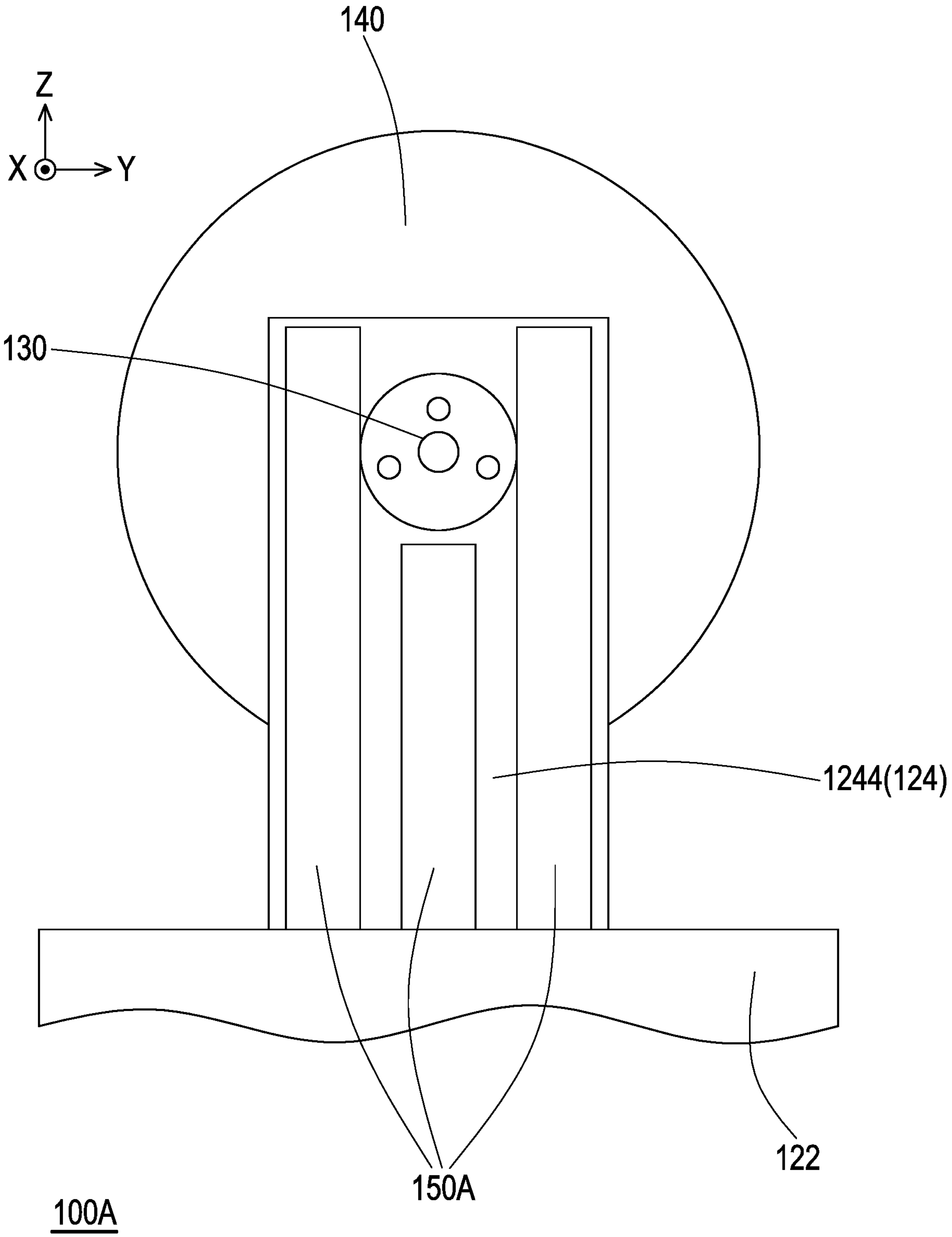
FIG. 4 is a partial schematic diagram of an optical module of another embodiment of the invention.

FIG. 4 is a partial schematic diagram of an optical module of another embodiment of the invention. The difference between the embodiment shown in FIG. 4 and the embodiment shown in FIG. 2 lies in that a heat conduction structure 150A of an optical module 100A in FIG. 4 is a high thermal conductivity material. Specifically, the heat conduction structure 150A of the present embodiment is a graphite sheet (the heat conduction coefficient is greater than 300 W/mK; three pieces are shown) that may be adhered to at least one of the first surface 1243 (FIG. 2) and the second surface 1244 of the support 124 via a heat conduction adhesive and extended outside the cover body (FIG. 2) along with the support 124. Of course, the type of high thermal conductivity material is not limited thereto. Since the thermal conductivity of the heat conduction structure 150A is greater than the thermal conductivity of the support 124, that is, the overall heat resistance of the heat conduction structure 150A and the support 124 is less than the heat resistance of using only the support 124, the thermal conductivity of the optical module 100A is enhanced, thus facilitating the discharge of the heat generated by the phosphor disk 140 and the driving device 130 (FIG. 2) out of the cover body 110 more effectively.

Figure 5:
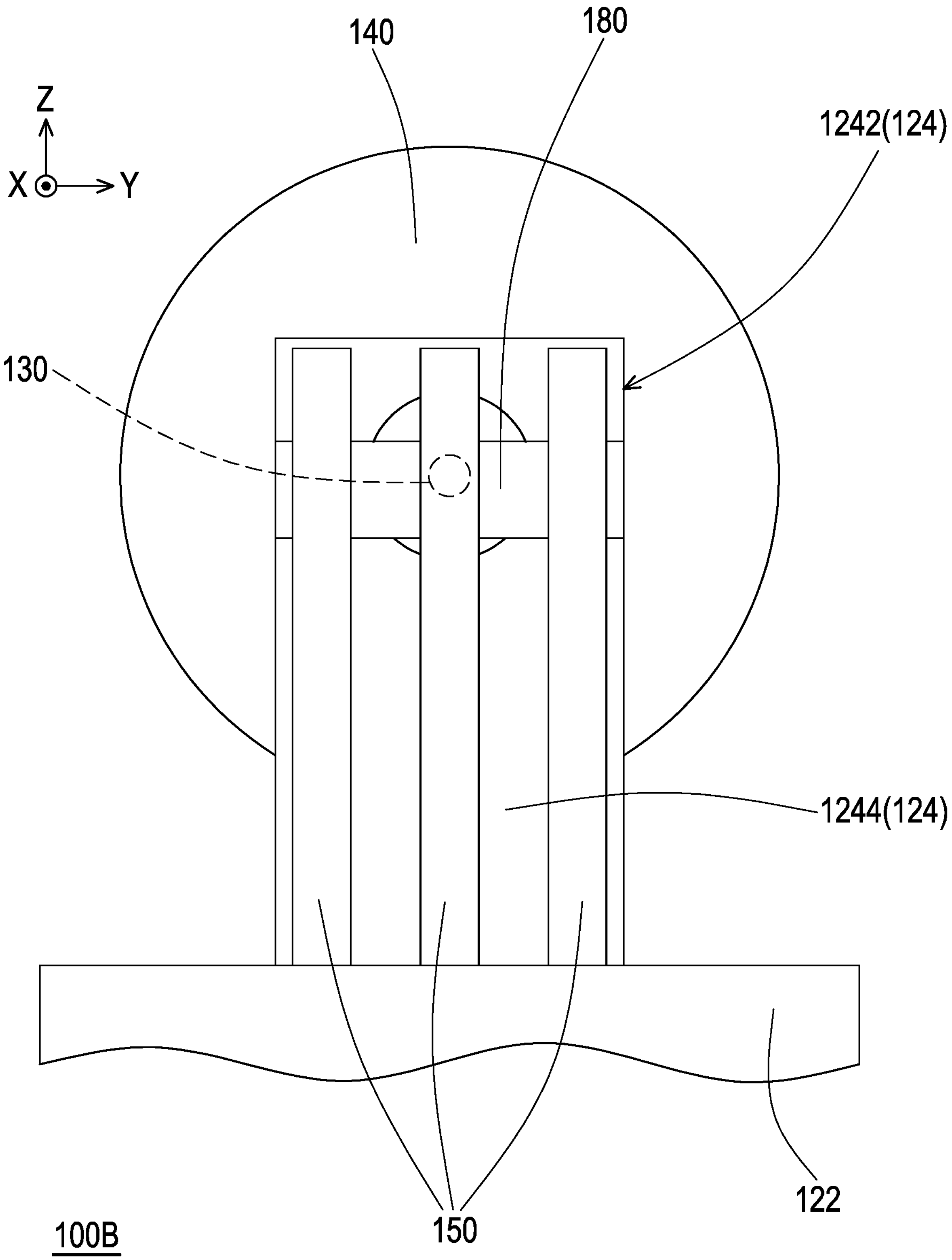
FIG. 5 is a partial schematic diagram of an optical module of another embodiment of the invention.

FIG. 5 is a partial schematic diagram of an optical module of another embodiment of the invention. In order to clearly show the driving device hidden by the cooling element, the driving device is drawn with dashed lines. The difference between the embodiment shown in FIG. 5 and the embodiment shown in FIG. 4 lies in that an optical module 100B of FIG. 5 further includes a cooling element 180, and the heat conduction structure 150 is a heat pipe. In detail, the cooling element 180 is, for example, a thermo-electric cooling module (TEC) disposed at the second end portion 1242 of the support 124 and located between the driving device 130 and the heat conduction structure 150. The side of the cooling element 180 in contact with the driving device 130 directly cools the driving device 130 to reduce the temperature of the driving device 130. Moreover, another side of the cooling element 180 in contact with the heat conduction structure 150 may discharge the heat from the phosphor disk 140 and the driving device 130 out of the cover body 110 via the heat conduction structure 150 to reduce the temperature inside the cover body 110. Since the heat conduction structure 150 of the present embodiment is a heat pipe, the heat dissipation structure 170 in the embodiment shown in FIG. 2 may be used in conjunction to further enhance the heat exchange effect of the heat conduction structure 150.

Figure 6A:
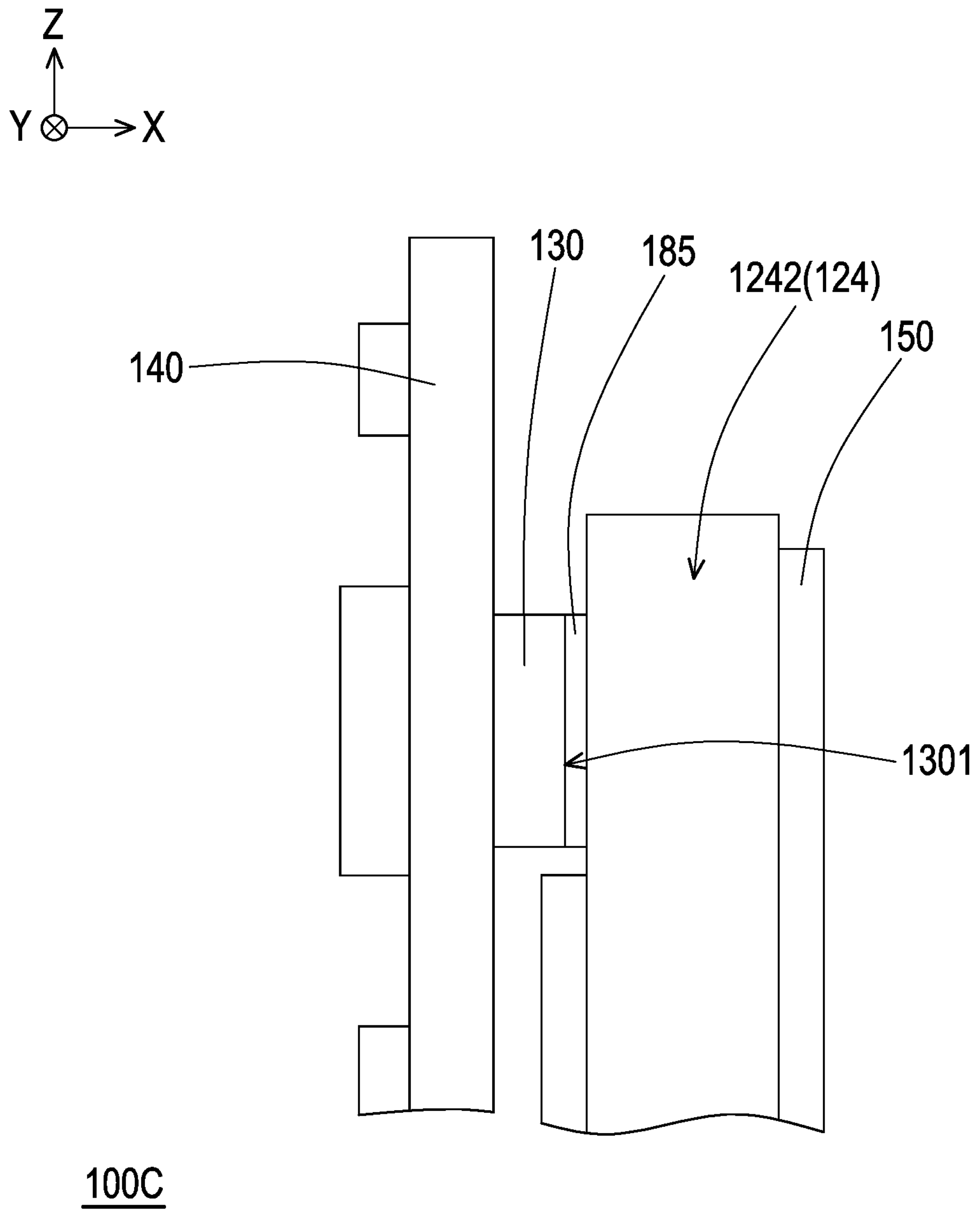
FIG. 6A is a partial schematic diagram of a projection device of another embodiment of the invention.
Figure 6B:
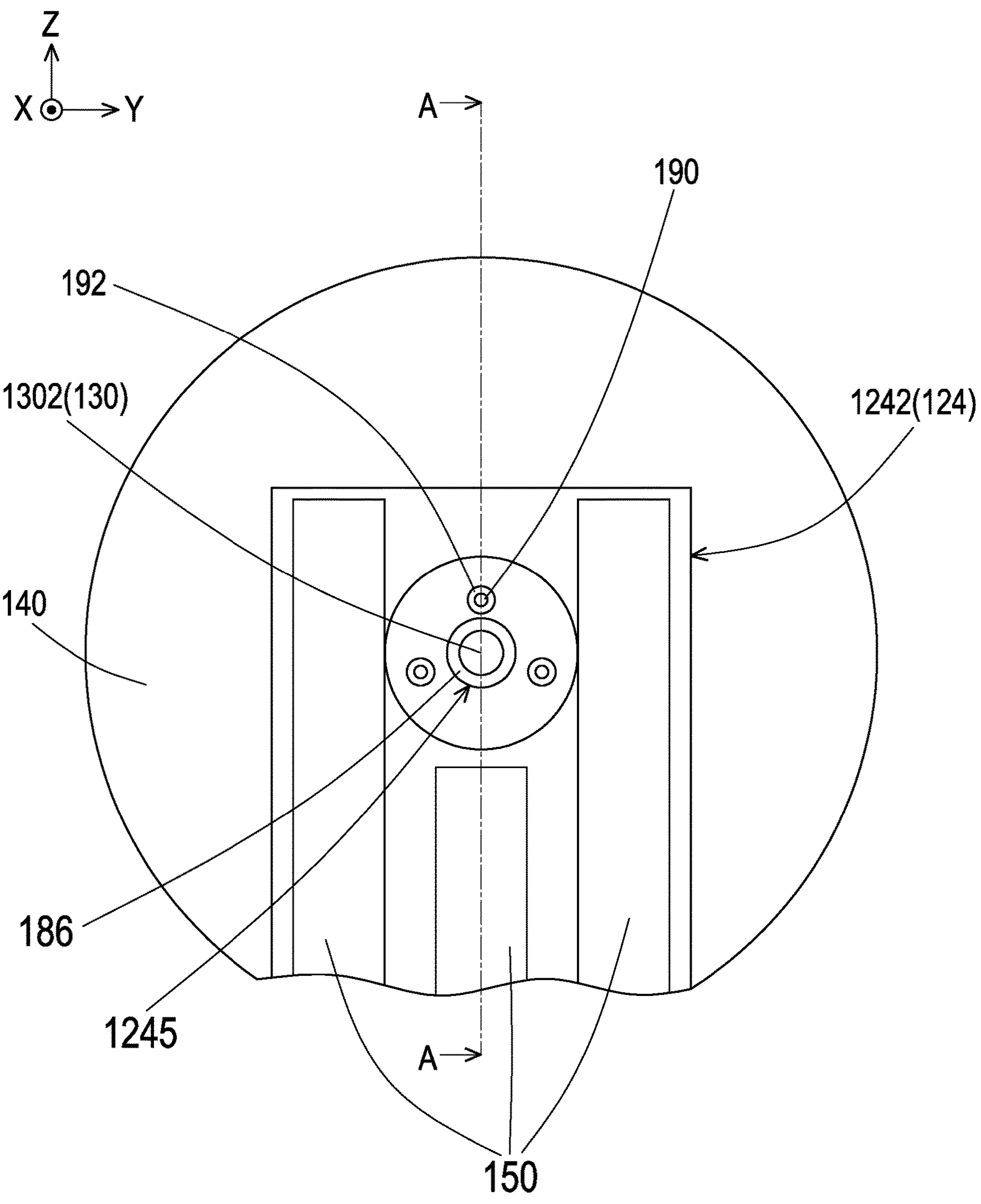
FIG. 6B is a partial schematic diagram of another viewing angle of the projection device of FIG. 6A.
Figure 6C:
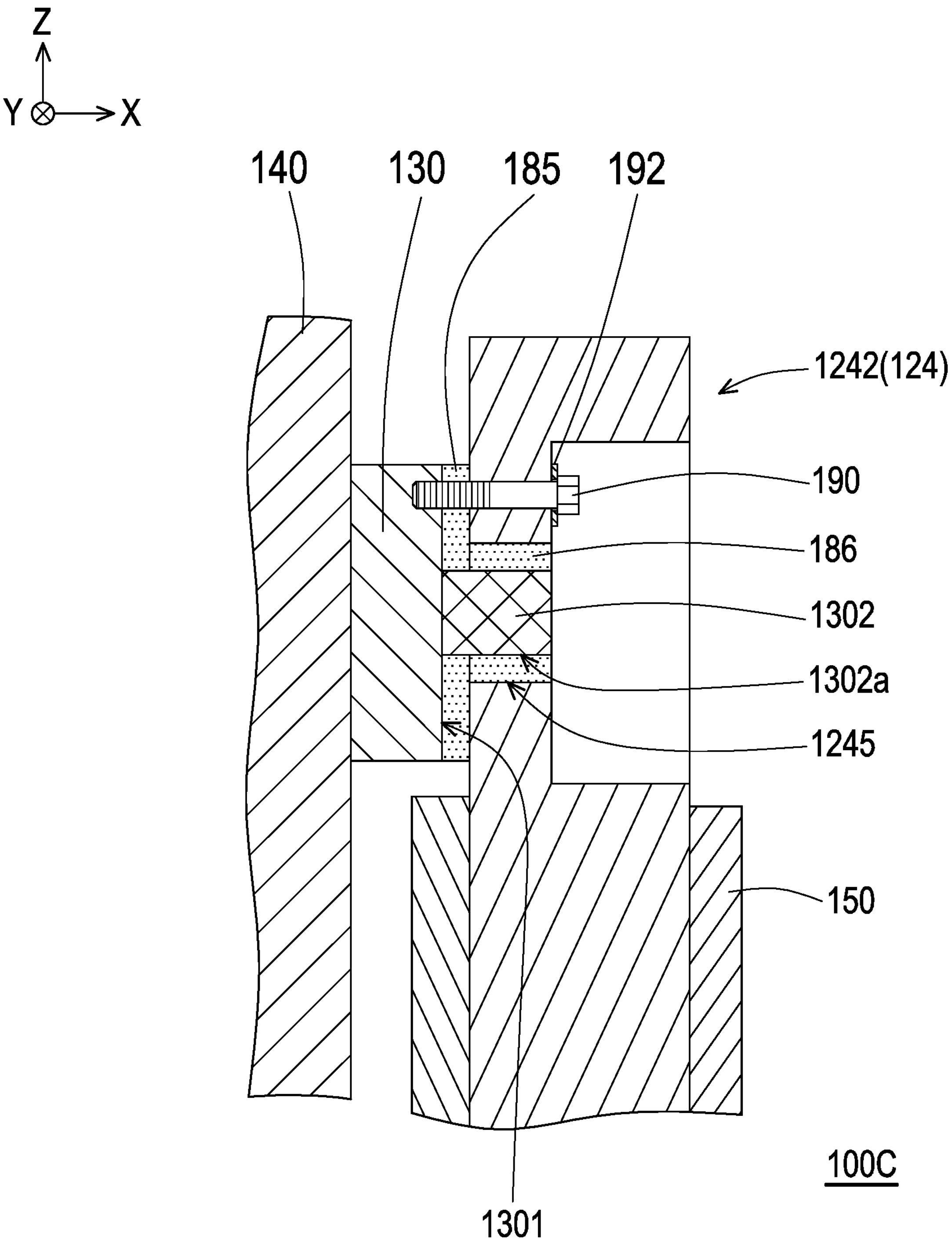
FIG. 6C is a schematic partial cross-sectional diagram of the optical module of FIG. 6B along line A-A.

FIG. 6A is a partial schematic diagram of a projection device of another embodiment of the invention. FIG. 6B is a partial schematic diagram of another viewing angle of the projection device of FIG. 6A. FIG. 6C is a schematic partial cross-sectional diagram of the optical module of FIG. 6B along line A-A. The difference between the embodiment shown in FIG. 6A to FIG. 6C and the embodiment shown in FIG. 4 lies in that an optical module 100C of FIG. 6A to FIG. 6C further includes thermal interface layers 185 and 186 (FIG. 6B). The driving device 130 has a back side 1301 and a protruding portion 1302 (FIG. 6B), and the back side 1301 faces the second end portion 1242 of the support 124. The support 124 has an open hole 1245 at the second end portion 1242, and the protruding portion 1302 has an annular side surface 1302*a* (FIG. 6C). When the back side 1301 of the driving device 130 is locked to the second end portion 1242 of the support 124 via locking members 190 (FIG. 6C), the protruding portion 1302 is extended into the open hole 1245, and buffer members 192 (FIG. 6C, such as rubber gaskets) are provided between the locking member 190 and the support 124 to reduce the vibration of the support 124.

The thermal interface layers 185 and 186 (thermal conductivity greater than 1 W/mK) of the present embodiment may be layered structures or colloids, the thermal interface layer 185 is disposed between the back side 1301 and the support 124 in a filling or coating manner and in contact with the back side 1301 and the support 124, and the thermal interface layer 186 is disposed between the annular side surface 1302*a* and the inner wall of the open hole 1245 via a filling or coating method and in contact with the annular side surface 1302*a* and the inner wall. That is to say, the thermal interface layers 185 and 186 may be disposed in the gap between the driving device 130 and the support 124. In this way, the overall thermal resistance increased due to the existence of buffer members 192 is reduced, and different heat conduction paths are provided (i.e., heat may be transferred from the driving device 130 to the support 124 via the thermal interface layer 185), so that the heat generated by the phosphor disk 140 and the driving device 130 may be discharged out of the cover body 110 (FIG. 2) more effectively to achieve the effect of reducing the temperature inside the cover body 110.

Based on the above, the embodiments of the invention have at least one of the following advantages or functions. The phosphor disk of the optical module is connected to the driving device, the driving device is disposed at the support, and the support is connected to the base body. Since the support is equipped with a heat conduction structure, not only the heat generated by the driving device may be discharged via the support and the heat conduction structure, but the heat generated by the phosphor disk may also be discharged via the driving device, the support, and the heat conduction structure, thereby effectively improving the heat dissipation capability of the optical module. In addition, the heat conduction structure may also be combined with the heat dissipation structure to improve the heat exchange efficiency of the heat conduction structure and further improve the heat dissipation performance of the optical module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical module, comprising:

a base body comprising a base and a support, wherein the support has a first end portion and a second end portion opposite to each other, and the first end portion is connected to the base;

a driving device disposed at the second end portion of the support;

a phosphor disk connected to the driving device, wherein the driving device is suitable for driving the phosphor disk to rotate; and at least one heat conduction structure disposed on the support, wherein the base comprises at least one through hole, the support is located at a side of the base, and the at least one heat conduction structure passes through the through hole of the base and is extended to another side of the base.

2. The optical module of claim 1, wherein the at least one heat conduction structure is extended from the second end portion to the first end portion.

3. The optical module of claim 1, wherein a thermal conductivity of the at least one heat conduction structure is greater than a thermal conductivity of the support.

4. The optical module of claim 1, wherein a thermal conductivity of the at least one heat conduction structure is greater than 300 W/mK.

5. The optical module of claim 1, wherein the at least one heat conduction structure is a graphite sheet.

6. The optical module of claim 1, wherein the at least one heat conduction structure is a heat pipe.

7. The optical module of claim 1, further comprising at least one heat dissipation structure, wherein the at least one heat conduction structure located at the another side of the base is connected to the at least one heat dissipation structure.

8. The optical module of claim 1, wherein the support has a first surface and a second surface opposite to each other, the first surface faces the phosphor disk, and the at least one heat conduction structure is disposed on the first surface, the second surface, or a combination thereof.

9. The optical module of claim 1, wherein the at least one heat conduction structure is in contact with the driving device.

10. The optical module of claim 1, further comprising a cover body, wherein the cover body is assembled on the base and has an accommodating space, and at least a portion of the support, the driving device, and the phosphor disk are located in the accommodating space.

11. The optical module of claim 10, wherein the cover body has an opening, the base covers the opening, and the support passes through the opening and is extended into the accommodating space.

12. The optical module of claim 11, further comprising a sealing structure, wherein the sealing structure is disposed between the base and the cover body and surrounds the opening.

13. The optical module of claim 1, further comprising a cooling element, wherein the cooling element is disposed at the second end portion of the support and in contact with the driving device and the at least one heat conduction structure.

14. The optical module of claim 1, further comprising a thermal interface layer, wherein the driving device has a back side, the back side faces the second end portion of the support, and the thermal interface layer is disposed between the back side and the support and in contact with the back side and the support.

15. The optical module of claim 14, wherein a thermal conductivity of the thermal interface layer is greater than 1 W/mK.

16. The optical module of claim 1, further comprising a thermal interface layer, wherein the support has an open hole at the second end portion, the driving device has a protruding portion, the protruding portion has an annular side surface, the protruding portion is extended into the open hole, and the thermal interface layer is disposed between the annular side surface and an inner wall of the open hole and in contact with the annular side surface and the inner wall.

17. The optical module of claim 16, wherein a thermal conductivity of the thermal interface layer is greater than 1 W/mK.

18. The optical module of claim 1, wherein a surface of the phosphor disk has at least one phosphor material configured to receive and convert a laser beam into a colored light.

19. A projection device, comprising:

a light source configured to provide an illumination beam;

a light valve configured to convert the illumination beam into an image beam;

a projection lens configured to project the image beam out of the projection device; and an optical module, comprising:
a base body comprising a base and a support, wherein the support has a first end portion and a second end portion opposite to each other, and the first end portion is connected to the base;
a driving device disposed at the second end portion of the support;
a phosphor disk connected to the driving device and located on a transmission path of the illumination beam, wherein the driving device is suitable for driving the phosphor disk to rotate; and
at least one heat conduction structure disposed on the support,
wherein the base comprises a through hole, the support is located at a side of the base, and the at least one heat conduction structure passes through the through hole of the base and is extended to another side of the base.

20. The projection device of claim 19, wherein the at least one heat conduction structure is extended from the second end portion to the first end portion.

21. The projection device of claim 19, wherein a thermal conductivity of the at least one heat conduction structure is greater than a thermal conductivity of the support.

22. The projection device of claim 19, wherein a thermal conductivity of the at least one heat conduction structure is greater than 300 W/mK.

23. The projection device of claim 19, wherein the at least one heat conduction structure is a graphite sheet.

24. The projection device of claim 19, wherein the at least one heat conduction structure is a heat pipe.

25. The projection device of claim 19, further comprising at least one heat dissipation structure, wherein the at least one heat conduction structure located at the another side of the base is connected to the at least one heat dissipation structure.

26. The projection device of claim 19, wherein the support has a first surface and a second surface opposite to each other, the first surface faces the phosphor disk, and the at least one heat conduction structure is disposed on the first surface, the second surface, or a combination thereof.

27. The projection device of claim 19, wherein the at least one heat conduction structure is in contact with the driving device.

28. The projection device of claim 19, further comprising a cover body, wherein the cover body is assembled on the base and has an accommodating space, and at least a portion of the support, the driving device, and the phosphor disk are located in the accommodating space.

29. The projection device of claim 28, wherein the cover body has an opening, the base covers the opening, and the support passes through the opening and is extended into the accommodating space.

30. The projection device of claim 29, further comprising a sealing structure, wherein the sealing structure is disposed between the base and the cover body and surrounds the opening.

31. The projection device of claim 19, further comprising a cooling element, wherein the cooling element is disposed at the second end portion of the support and in contact with the driving device and the at least one heat conduction structure.

32. The projection device of claim 19, further comprising a thermal interface layer, wherein the driving device has a back side, the back side faces the second end portion of the support, and the thermal interface layer is disposed between the back side and the support and in contact with the back side and the support.

33. The projection device of claim 32, wherein a thermal conductivity of the thermal interface layer is greater than 1 W/mK.

34. The projection device of claim 19, further comprising a thermal interface layer, wherein the support has an open hole at the second end portion, the driving device has a protruding portion, the protruding portion has an annular side surface, the protruding portion is extended into the open hole, and the thermal interface layer is disposed between the annular side surface and an inner wall of the open hole and in contact with the annular side surface and the inner wall.

35. The projection device of claim 34, wherein a thermal conductivity of the thermal interface layer is greater than 1 W/mK.

36. The projection device of claim 19, wherein a surface of the phosphor disk has at least one phosphor material configured to receive and convert a laser beam into a colored light.

37. A projection device, comprising:
a light source configured to provide an illumination beam;
a light valve configured to convert the illumination beam into an image beam;
a projection lens configured to project the image beam out of the projection device; and
an optical module, comprising:
a base body comprising a base and a support, wherein the support has a first end portion and a second end portion opposite to each other, and the first end portion is connected to the base;
a driving device disposed at the second end portion of the support;
a phosphor disk connected to the driving device and located on a transmission path of the illumination beam, wherein the driving device is suitable for driving the phosphor disk to rotate; and
at least one heat conduction structure disposed on the support,
wherein the support has a first surface and a second surface opposite to each other, the first surface faces the phosphor disk, and the at least one heat conduction structure is disposed on the first surface, the second surface, or a combination thereof.

38. A projection device, comprising:
a light source configured to provide an illumination beam;
a light valve configured to convert the illumination beam into an image beam;
a projection lens configured to project the image beam out of the projection device; and
an optical module, comprising:
a base body comprising a base and a support, wherein the support has a first end portion and a second end portion opposite to each other, and the first end portion is connected to the base;
a driving device disposed at the second end portion of the support;
a phosphor disk connected to the driving device and located on a transmission path of the illumination beam, wherein the driving device is suitable for driving the phosphor disk to rotate; and
at least one heat conduction structure disposed on the support,
wherein the projection device further comprises a thermal interface layer, the driving device has a back side, the back side faces the second end portion of the support, and the thermal interface layer is disposed between the back side and the support and in contact with the back side and the support.

* * * * *